(12) United States Patent
Hsu et al.

(10) Patent No.: US 7,127,727 B2
(45) Date of Patent: Oct. 24, 2006

(54) TRAY LOCKING MECHANISM USED IN AN OPTICAL DISK DRIVE

(75) Inventors: Cheng-Chung Hsu, Taipei (TW); In-Shuen Lee, Taipei (TW); Jui-Nan Chuang, Taipei (TW)

(73) Assignee: Lite-On It Corporation, Taipei (TW)

( * ) Notice: Subject to any disclaimer, the term of this patent is extended or adjusted under 35 U.S.C. 154(b) by 137 days.

(21) Appl. No.: 10/709,934

(22) Filed: Jun. 7, 2004

(65) Prior Publication Data

US 2004/0261088 A1 Dec. 23, 2004

(30) Foreign Application Priority Data

Jun. 18, 2003 (TW) ................. 92116584 A

(51) Int. Cl.
*G11B 33/02* (2006.01)
(52) U.S. Cl. .................. 720/637; 720/601; 720/610; 720/636
(58) Field of Classification Search ............... 720/601, 720/610, 636, 637
See application file for complete search history.

(56) References Cited

U.S. PATENT DOCUMENTS

| | | | | |
|---|---|---|---|---|
| 4,410,921 A | * | 10/1983 | Yamamura | 360/99.06 |
| 5,563,865 A | * | 10/1996 | Wheeler | 720/608 |
| 5,646,926 A | * | 7/1997 | Handa et al. | 720/636 |
| 6,266,311 B1 | * | 7/2001 | Song et al. | 720/609 |
| 6,452,887 B1 | * | 9/2002 | Nakayama et al. | 720/664 |
| 6,618,341 B1 | * | 9/2003 | Yamashita et al. | 720/621 |
| 6,654,334 B1 | * | 11/2003 | Yamashita et al. | 720/641 |
| 6,731,580 B1 | * | 5/2004 | Sato et al. | 720/655 |
| 6,925,647 B1 | * | 8/2005 | Kabasawa | 720/601 |
| 2003/0026188 A1 | * | 2/2003 | Sugiura et al. | 369/75.2 |
| 2003/0137917 A1 | * | 7/2003 | Hekizono | 369/75.2 |
| 2004/0001417 A1 | * | 1/2004 | Huang et al. | 369/75.2 |
| 2004/0027962 A1 | * | 2/2004 | Kabasawa | 369/75.2 |

FOREIGN PATENT DOCUMENTS

| | | | | |
|---|---|---|---|---|
| JP | 07240053 A | * | 9/1995 |
| JP | 07254202 A | * | 10/1995 |
| JP | 10106201 A | * | 4/1998 |
| JP | 2001126460 A | * | 5/2001 |
| JP | 2001184764 A | * | 7/2001 |

* cited by examiner

*Primary Examiner*—Andrea Wellington
*Assistant Examiner*—Matthew Greco Kayrish
(74) *Attorney, Agent, or Firm*—Winston Hsu

(57) ABSTRACT

An optical disk drive includes a main body and a tray. A tray locking mechanism includes a base fixed to the tray, a locking device installed on the base for combining with or separating from a stop pin of the main body, a transmission device installed on the base for driving the locking device, and a control device installed on the base for stopping the transmission device. When the locking device combines with the stop pin of the main body, the tray can be locked to the main body, and when the transmission device drives the locking device to be separated from the stop pin of the main body, the tray can eject from the main body and the control device can stop the transmission device from rotating.

10 Claims, 21 Drawing Sheets

TRAY LOCKING MECHANISM USED IN AN OPTICAL DISK DRIVE

BACKGROUND OF INVENTION

1. Field of the Invention

The present invention relates to an optical disk drive, and more particularly, to a tray locking mechanism for use in a slim optical disk drive.

2. Description of the Prior Art

Recently, owing to progress of computer technology, prices of optical disk drives are becoming lower. Slim optical disk drives are used for storage devices of notebooks, and because of increasing demand for notebooks on the market the demand for slim optical disk drives is also increasing. In addition, owing to the progress of computer technology, reading speeds of optical disk drives are becoming faster. Please refer to FIG. 1. FIG. 1 is a drawing of a conventional slim optical disk drive in an unlocked situation. The conventional slim optical disk drive includes a main body 1, a tray 2, an ejection button 3, and a tray locking mechanism 10 installed under the tray 2. Please refer to FIG. 2 and FIG. 3. FIG. 2 is a drawing of the conventional slim optical disk drive in a locked situation. FIG. 3 is an enlargement of the tray locking mechanism 10 in FIG. 2. The tray locking mechanism 10 includes a gyratory arm 4, a locking arm 5, a solenoid valve arm 6, a piston 7, and an ejecting board 8. The main body 1 includes a pin 11.

Please refer to FIG. 4. FIG. 4 is an enlargement of the tray locking mechanism 10 when the tray 2 ejects from the conventional slim optical disk drive. When the ejection button 3 is pressed, the piston 7 moves in the "A" direction to push the solenoid valve arm 6 to rotate in the "B" direction. Subsequently the solenoid valve arm 6 pushes the locking arm 5 to rotate in the "B" direction, so the locking arm 5 can separate from the pin 11 on the main body 1 so that the tray 2 can be ejected. At that time, a user can draw out the tray 2 and put on or take off an optical disk.

Please refer to FIG. 5. FIG. 5 is an enlargement of the tray locking mechanism 10 when the tray 2 is loaded into the conventional slim optical disk drive. When the tray 2 is pushed into the tray locking mechanism 10, the gyratory arm 4 can touch the ejecting board 8 and rotate in the "B" direction so as to push forward the locking arm 5 and the solenoid valve arm 6 to rotate in the "C" direction. Then, the solenoid valve arm 6 pushes the piston 7 to move in the "D" direction back to the original location. Please refer to FIG. 6. FIG. 6 is an enlargement of the tray locking mechanism 10 when the tray 2 is locked. When the locking arm 5 rotates in the "C" direction to a certain position, the pin 11 on the main body 11 can stop the locking arm 5 and the tray 2 can be locked. However, sometimes the tray locking mechanism 10 in the prior art lodges so that the tray 2 cannot be ejected smoothly. Thus, there is a need for tray locking mechanism to solve this problem.

SUMMARY OF INVENTION

It is therefore a primary objective of the claimed invention to provide a tray locking mechanism for use in a slim optical disk drive for locking and ejecting the tray more smoothly, to solve the above-mentioned problems.

According to the claimed invention, a tray locking mechanism for use in an optical disk drive is proposed. The optical disk drive includes a main body and a tray. The tray locking mechanism includes a base fixed to the tray, a locking device installed on the base for combining with or separating from a stop pin of the main body, a transmission device installed on the base for driving the locking device, and a control device installed on the base for stopping the transmission device. When the locking device combines with the stop pin of the main body, the tray can be locked to the main body, and when the transmission device drives the locking device to be separated from the stop pin of the main body, the tray can eject from the main body and the control device can stop the transmission device from rotating.

According to the claimed invention, an optical disk drive includes a main body including a stop pin, a tray for sliding between a locking position and a ejecting position corresponding to the main body, and a tray locking mechanism installed on the tray for combining with the stop pin of the main body when the tray is in the locking position and for separating from the stop pin device of the main body when the tray is in the ejecting position.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
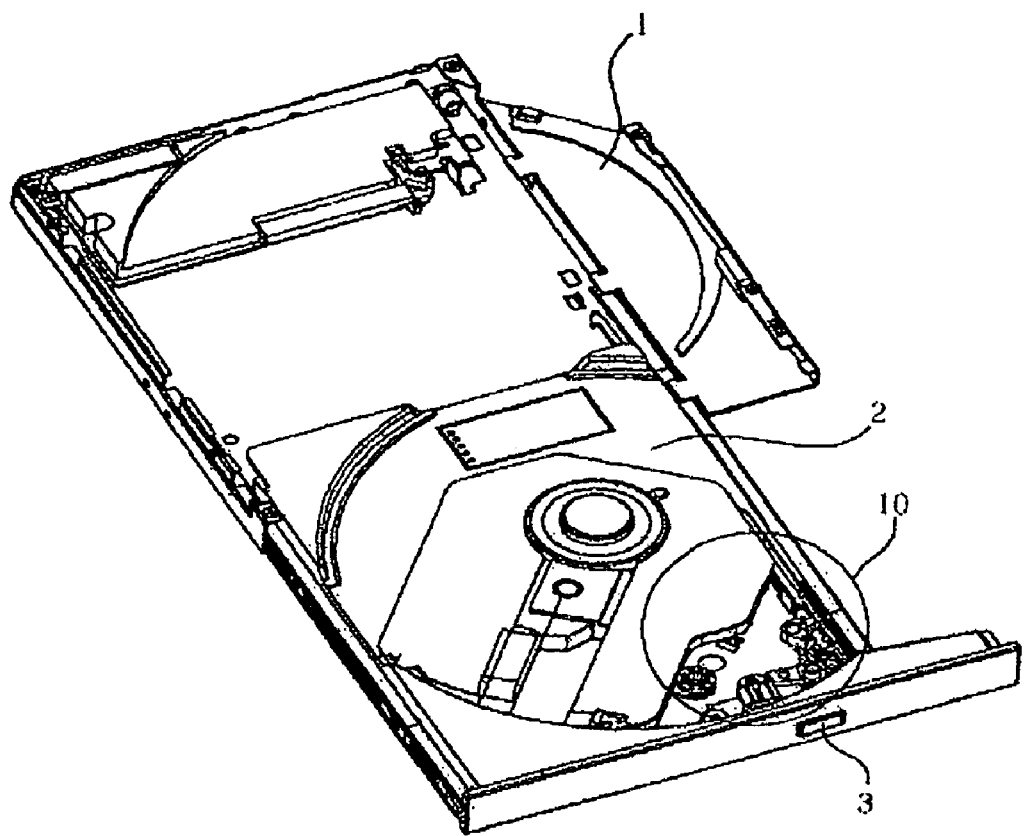
FIG. 1 is a drawing of a conventional slim optical disk drive in an unlocked situation.
Figure 2:
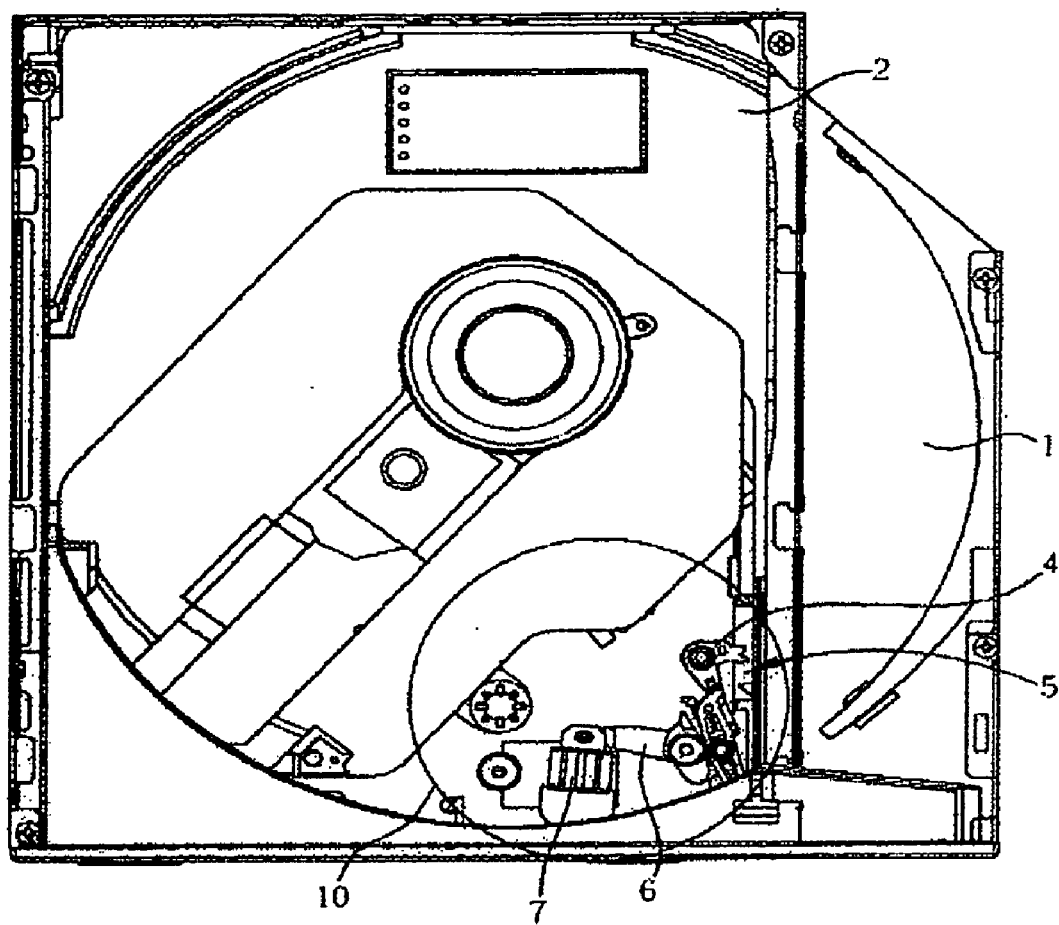
FIG. 2 is a drawing of the conventional slim optical disk drive in a locked situation.
Figure 3:
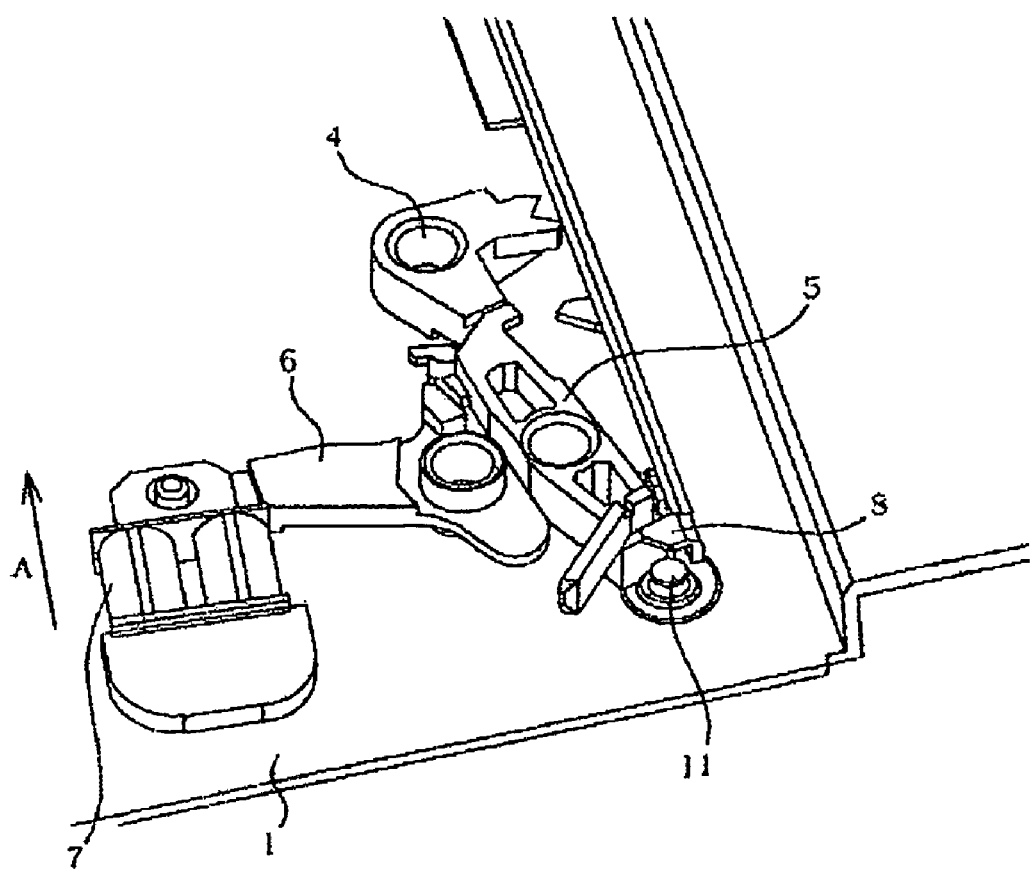
FIG. 3 is an enlargement of a tray locking mechanism in FIG. 2.
Figure 4:
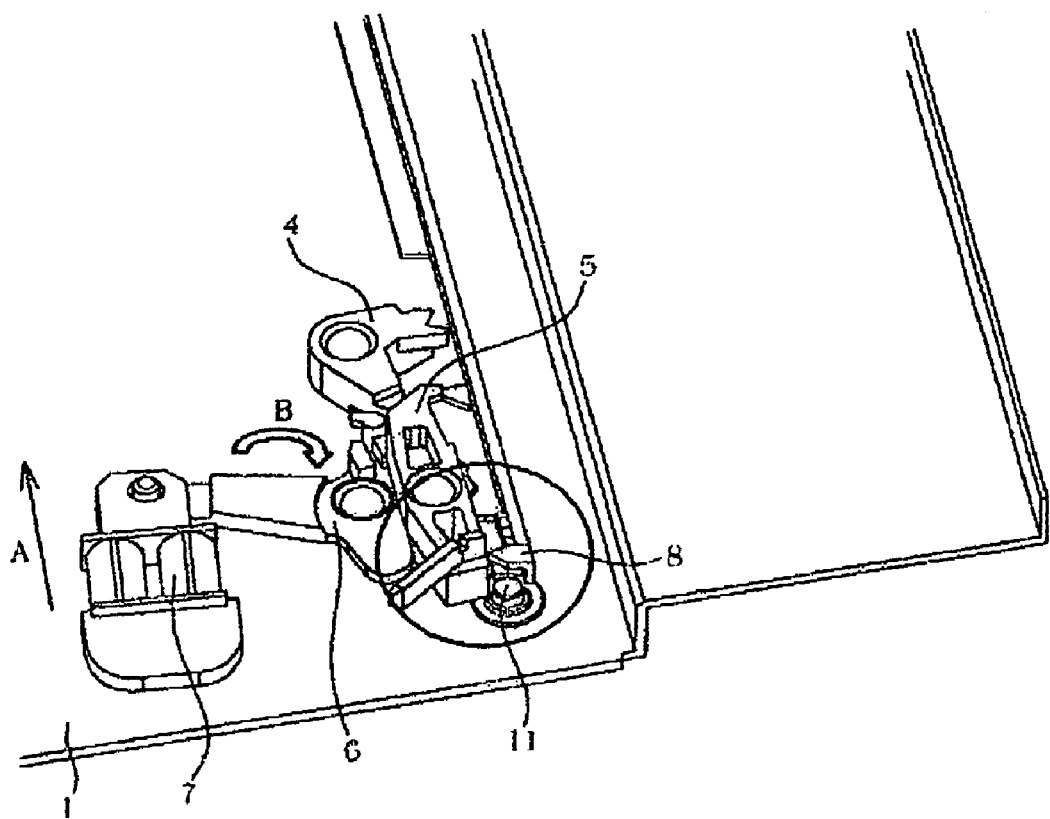
FIG. 4 is an enlargement of the tray locking mechanism when a tray ejects from the conventional slim optical disk drive.
Figure 5:
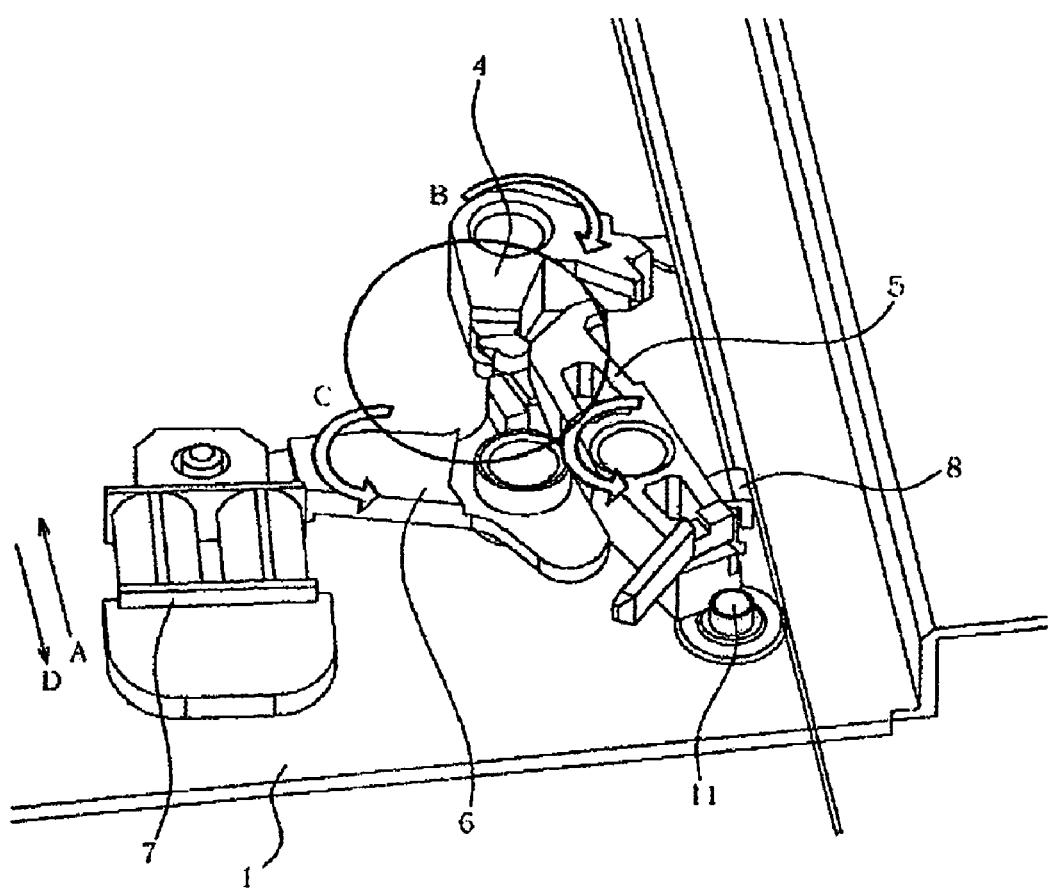
FIG. 5 is an enlargement of the tray locking mechanism when the tray is loaded into the conventional slim optical disk drive.
Figure 6:
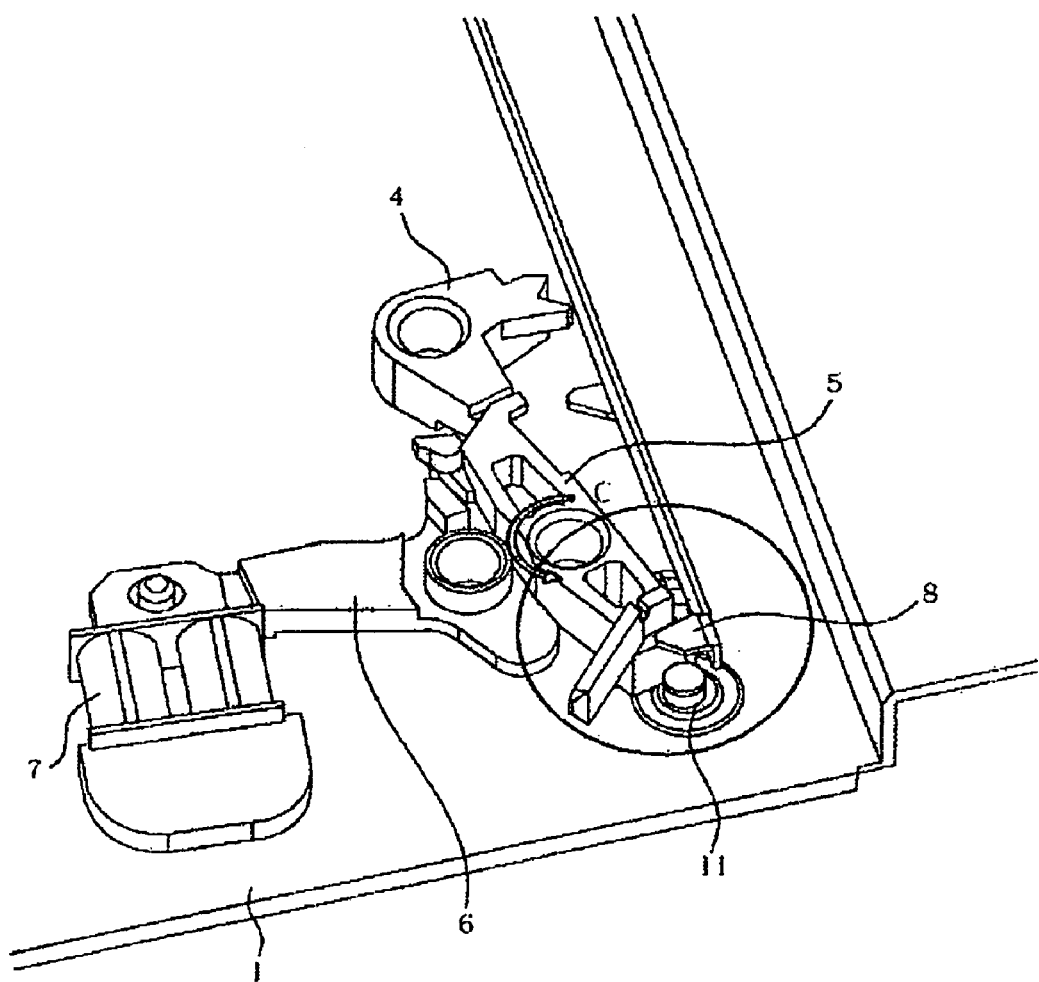
FIG. 6 is an enlargement of the tray locking mechanism when the tray is locked.

The embodiments according to the present invention are related to a slim optical disk drive. Additionally, the present invention can be used in all kinds of optical disk drives including CD-ROM, CD-RW, half-height drives, combo drives, DVD-R/RW, external drives, optical players, and so on. Please note that elements with the same reference numerals are substantially the same through the various embodiments.

Figure 7:
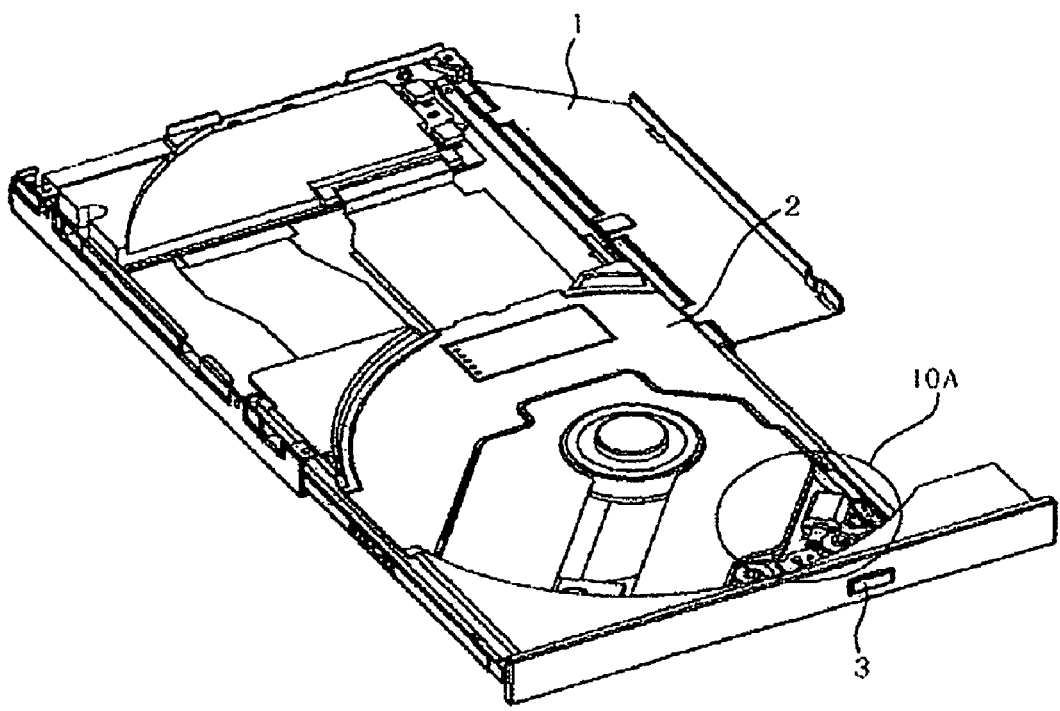
FIG. 7 is a drawing of a slim optical disk drive in an unlocked situation according to the present invention.
Figure 8:
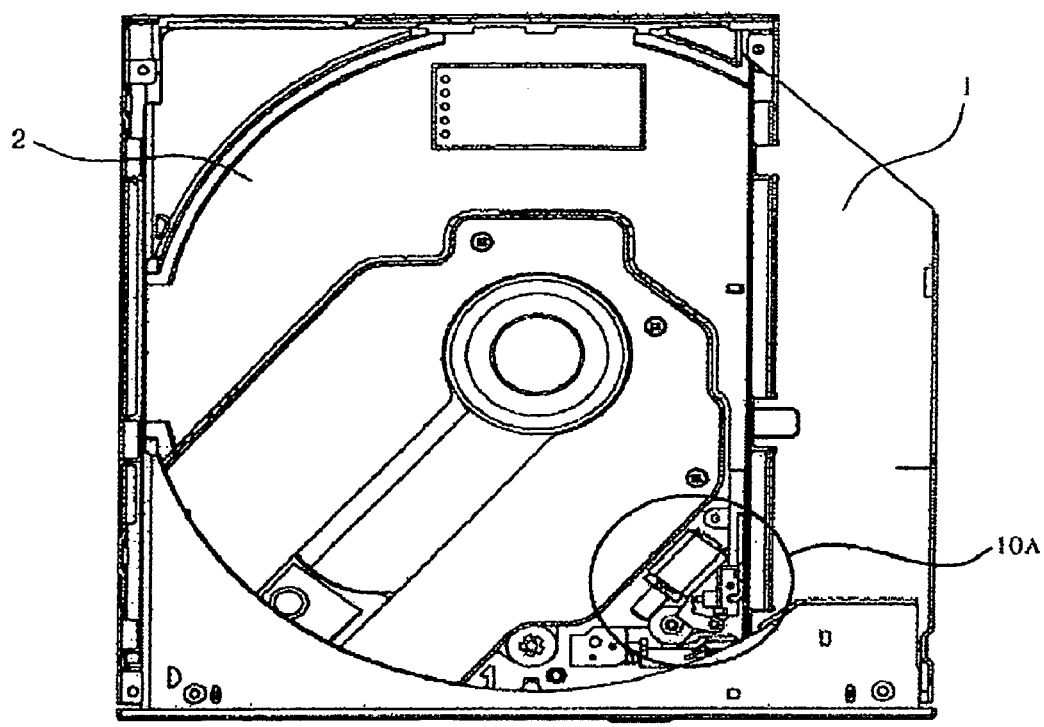
FIG. 8 is a drawing of a tray locking mechanism of a slim optical disk drive in a locked situation according to the present invention.
Figure 9:
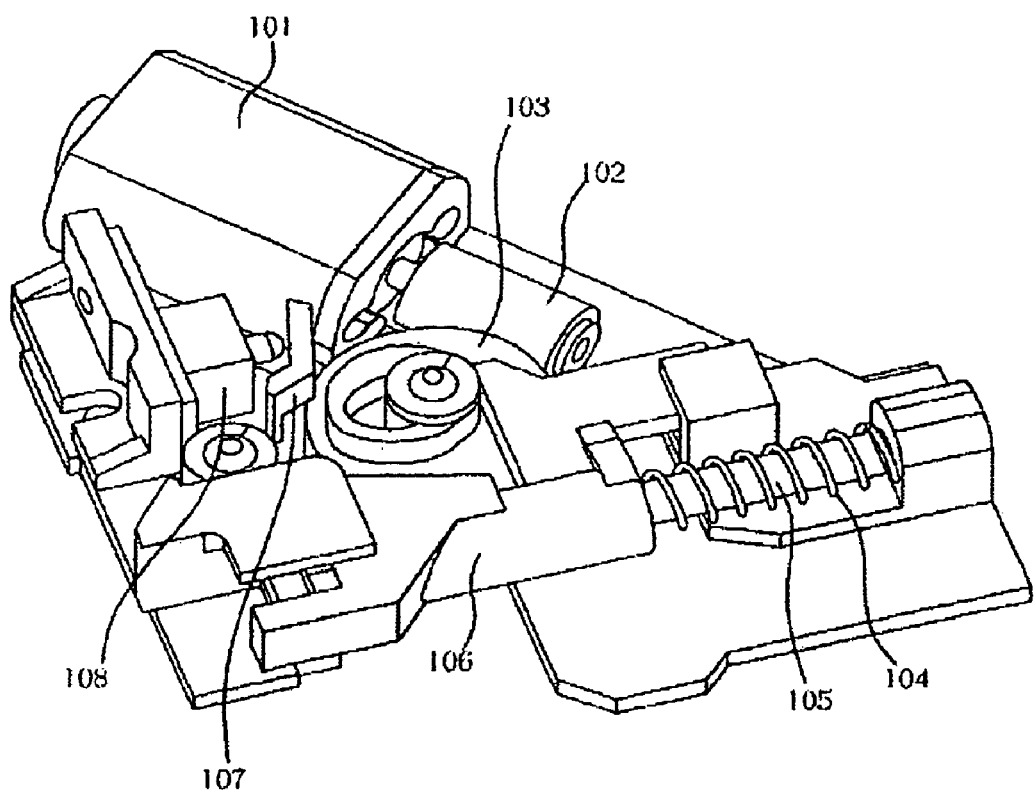
FIG. 9 is an enlargement of the tray locking mechanism.
Figure 10:
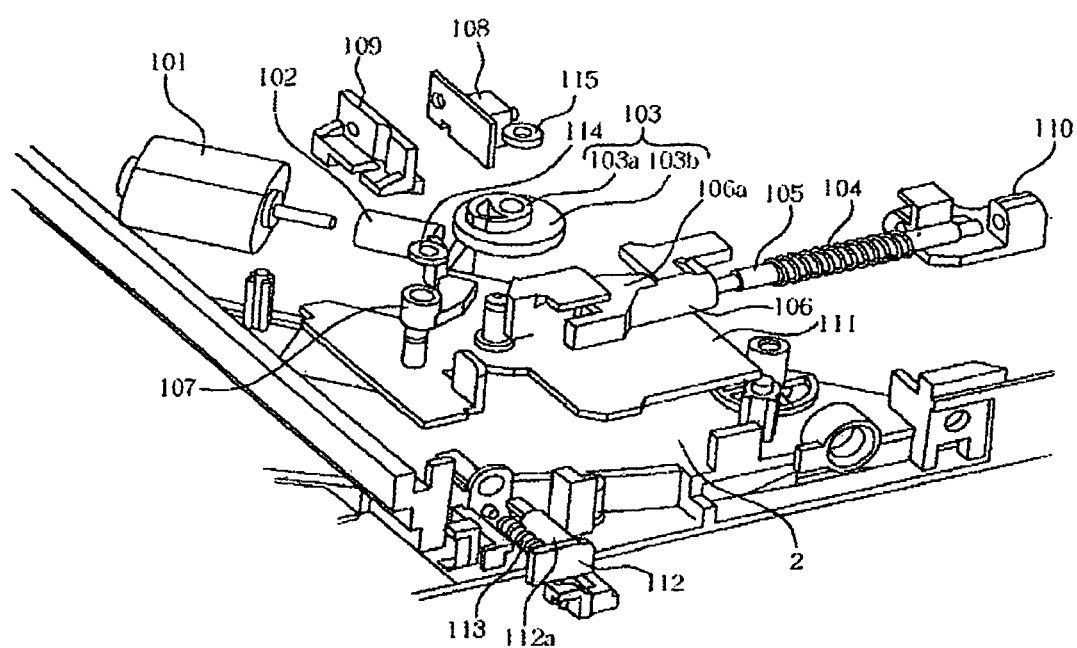
FIG. 10 is an exploded diagram of the tray locking mechanism.
Figure 11:
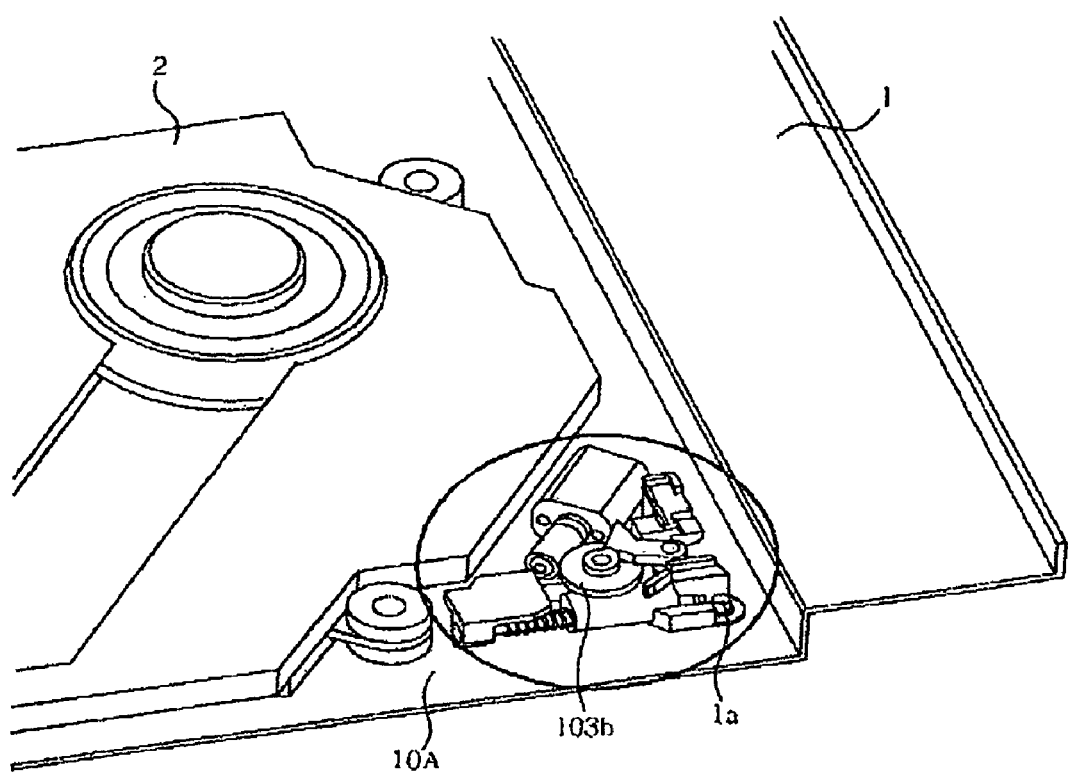
FIG. 11 is a drawing of components of the slim optical disk drive in a locked situation according to the present invention.
Figure 12:
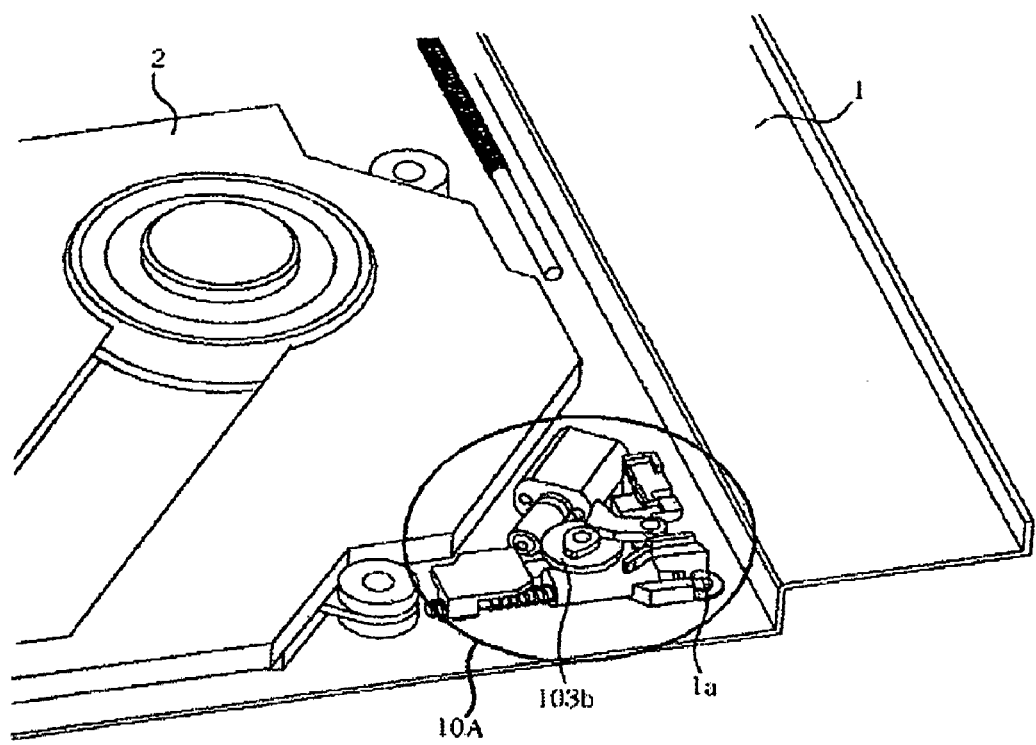
FIG. 12 is a drawing of components of the slim optical disk drive in an unlocked situation according to the present invention.
Figure 13:
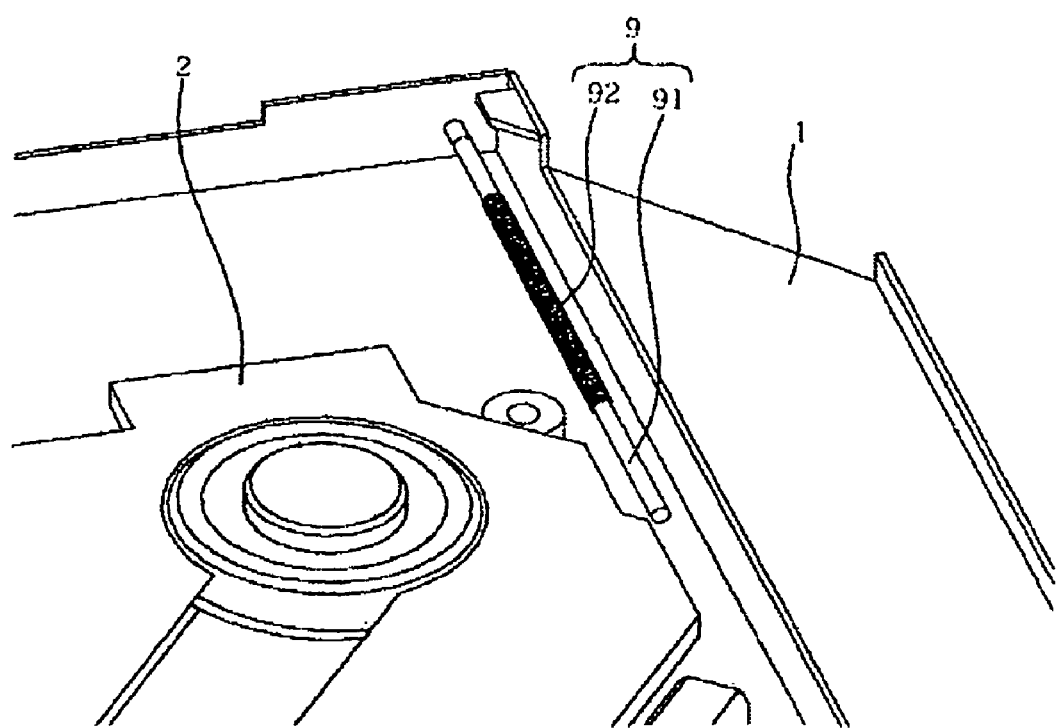
FIG. 13 is a drawing of an ejection device of the tray locking mechanism according to the present invention

Please refer to FIG. 7. FIG. 7 is a drawing of a slim optical disk drive in an unlocked situation according to the present invention. The slim optical disk drive includes a main body 1, a tray 2, an ejection button 3, and a tray locking mechanism 10A installed under the tray 2. Please refer to FIG. 8. FIG. 8 is a drawing of the tray locking mechanism 10A of the slim optical disk drive in a locked situation according to the present invention. Please refer to FIG. 9, FIG. 10, FIG. 11, FIG. 12, and FIG. 13. FIG. 9 is an enlargement of the tray locking mechanism 10A. FIG. 10 is an exploded diagram of the tray locking mechanism 10A. FIG. 11 is a drawing of components of the slim optical disk drive in a locked situation according to the present invention. FIG. 12 is a drawing of components of the slim optical disk drive in an unlocked situation according to the present invention. FIG. 13 is a drawing of an ejection device 9 of the tray locking mechanism 10A according to the present invention.

Please refer to FIG. 9 and FIG. 10. The tray locking mechanism 10A includes a driving element 101, a worm shaft 102, a worm gear 103, a rod 105, a locking shaft 106, a pressing arm 107, a switch 108, fixers 109, 110, a base 111, an emergency ejection device 112, elastic element 104, 113, and C-shaped hooks 114, 115.

The main body 1 is for supporting the whole optical disk drive. The main body 1 includes a stop pin 1a shown in FIG. 11 and FIG. 12. The tray 2 is for carrying an optical disk, and the ejection button 3 and the tray locking mechanism 10A are on the tray 2. As shown in FIG. 13, the ejection device 9 is located under the tray 2. The ejection device 9 includes a rod 91 and an elastic element 92 sheathed on the rod 91 for ejecting the tray 2 by an elastic force of the elastic element 92. The elastic element 92 can be a spring. Pressing the ejection button 3 to drive the tray locking mechanism 10A can eject the tray 2. The base 111 is locked above the tray 2. The driving element 101 is fixed to the base 111 for driving the worm shaft 102. The driving element 101 can be a DC motor. The worm shaft 102 is sheathed on a transmission shaft of the driving element 101 for driving the worm gear 103. The worm gear 103 is sheathed on the base 111 and meshes with the worm shaft 102. The C-shaped hook 115 can fix the worm gear 103, and the C-shaped hook 115 includes an upper cam 103a and a lower cam 103b. The pressing arm 107 is sheathed on the base 111 and fixed by the C-shaped hook 114 for pressing the switch 108. The fixer 109 is fixed to the base 111 and for fixing the switch 108. The switch 108 is for stopping the driving element 101 from rotating. The fixer 110 is also fixed to the base 111 too. The one end of the rod 105 is pivotally connected to the fixer 110, and the other end of the rod 105 is pivotally connected to the locking shaft 106. The elastic element 104 is sheathed on the rod 105 for providing an elastic force to the locking shaft 106. The elastic element 104 can be a spring. The one end of the locking shaft 106 is pivotally connected to the rod 105, and the locking shaft 106 includes an unciform part 106a on the other end for hooking the stop pin 1a of the main body 1 to lock the tray 2, and a driving part 106b.

Figure 16:
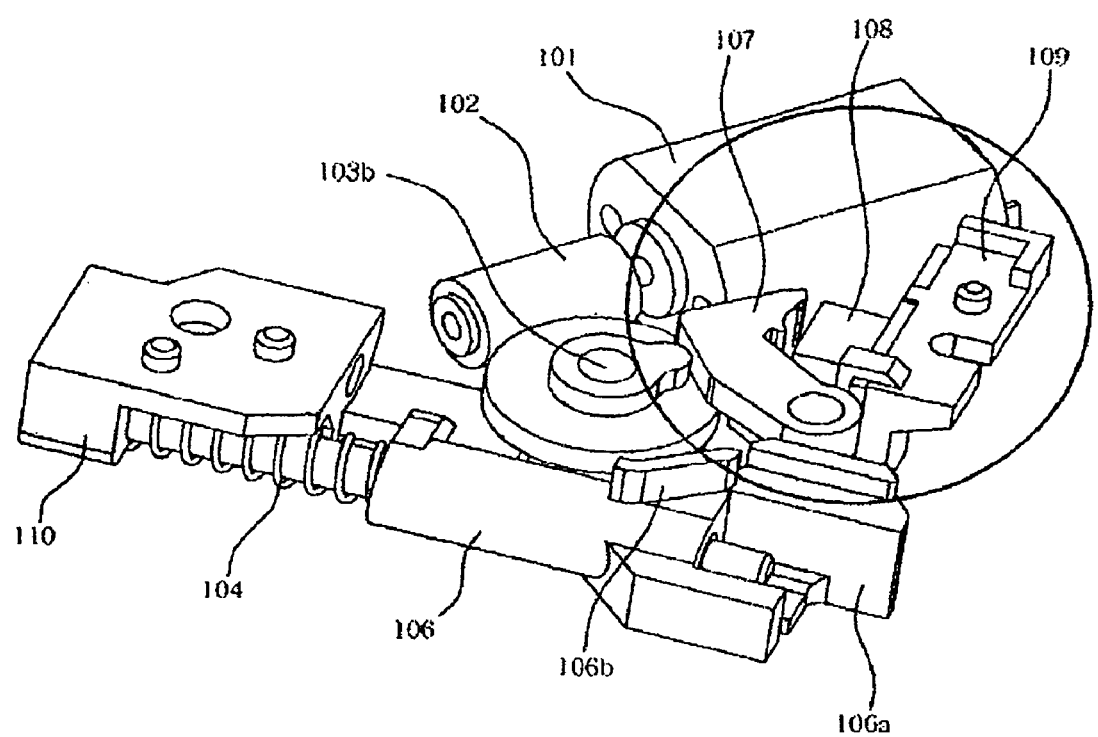
Figure 17:
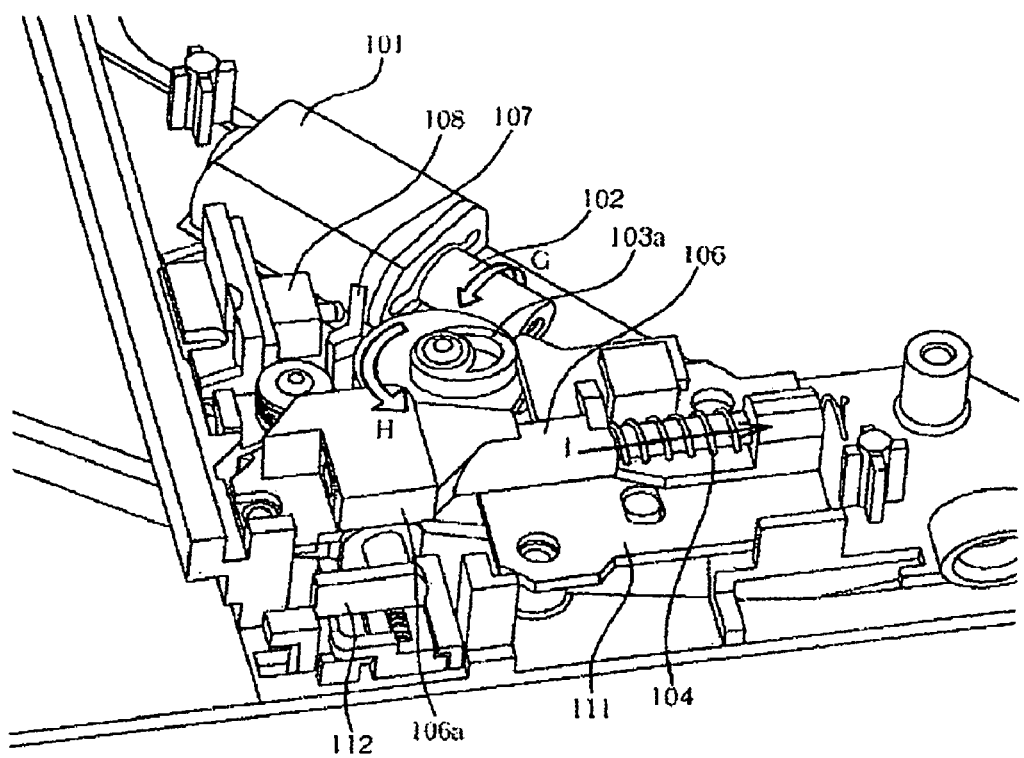
Figure 18:
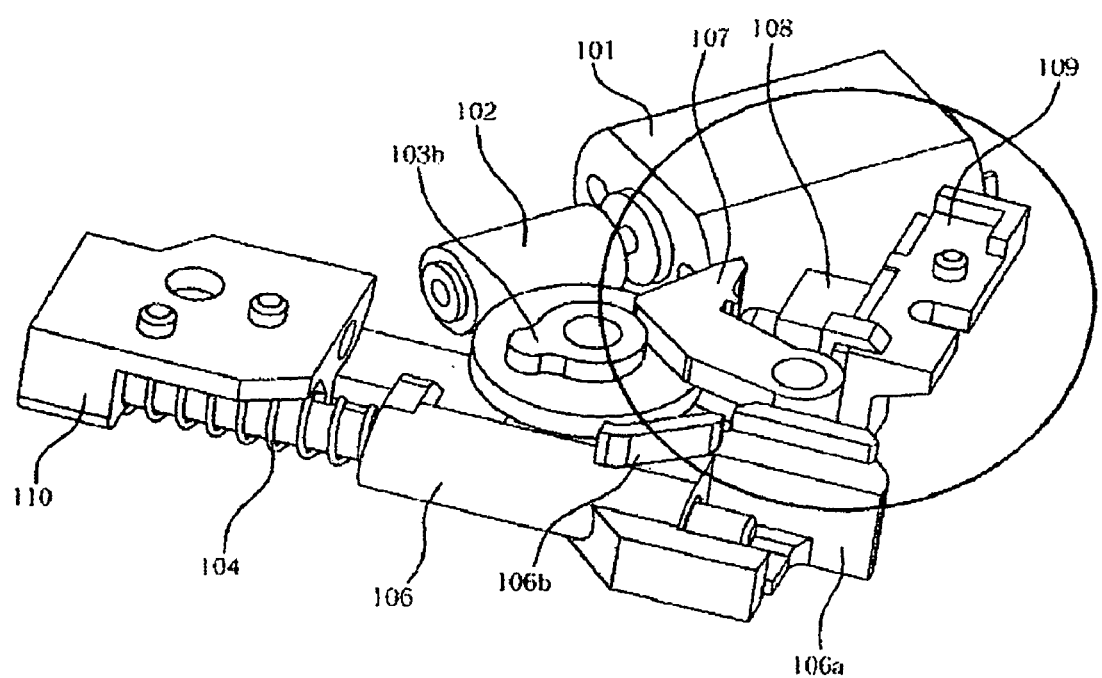
Figure 19:
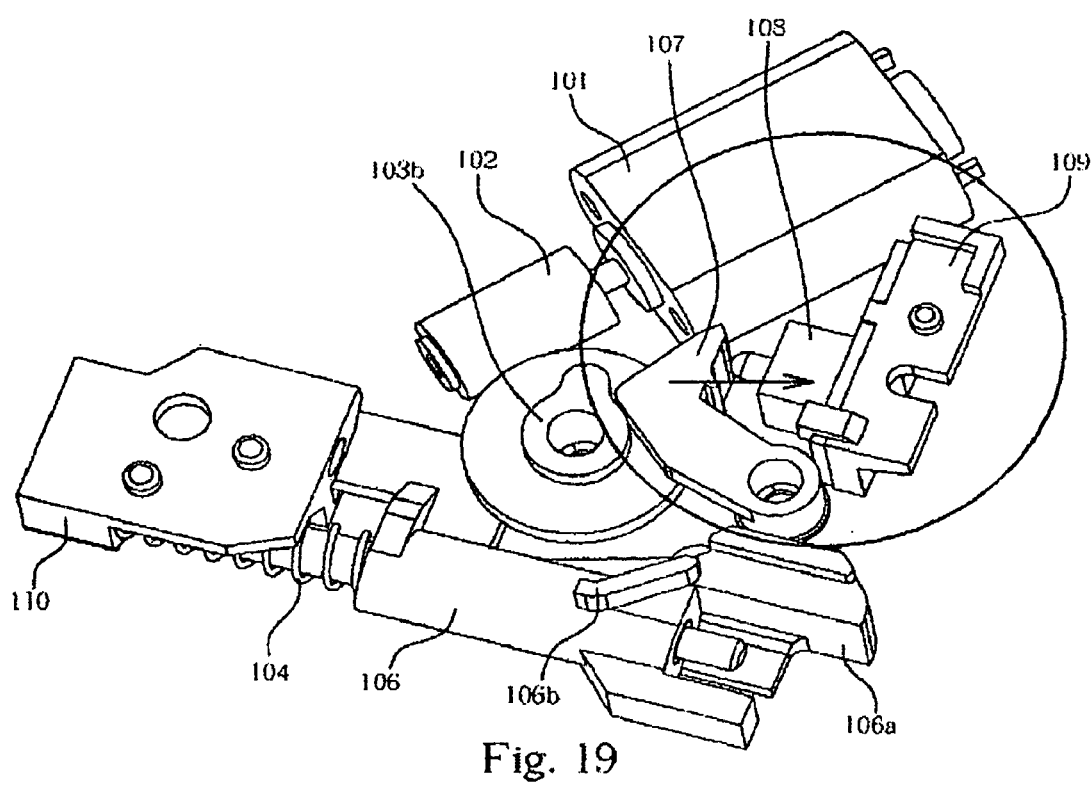
Figure 20:
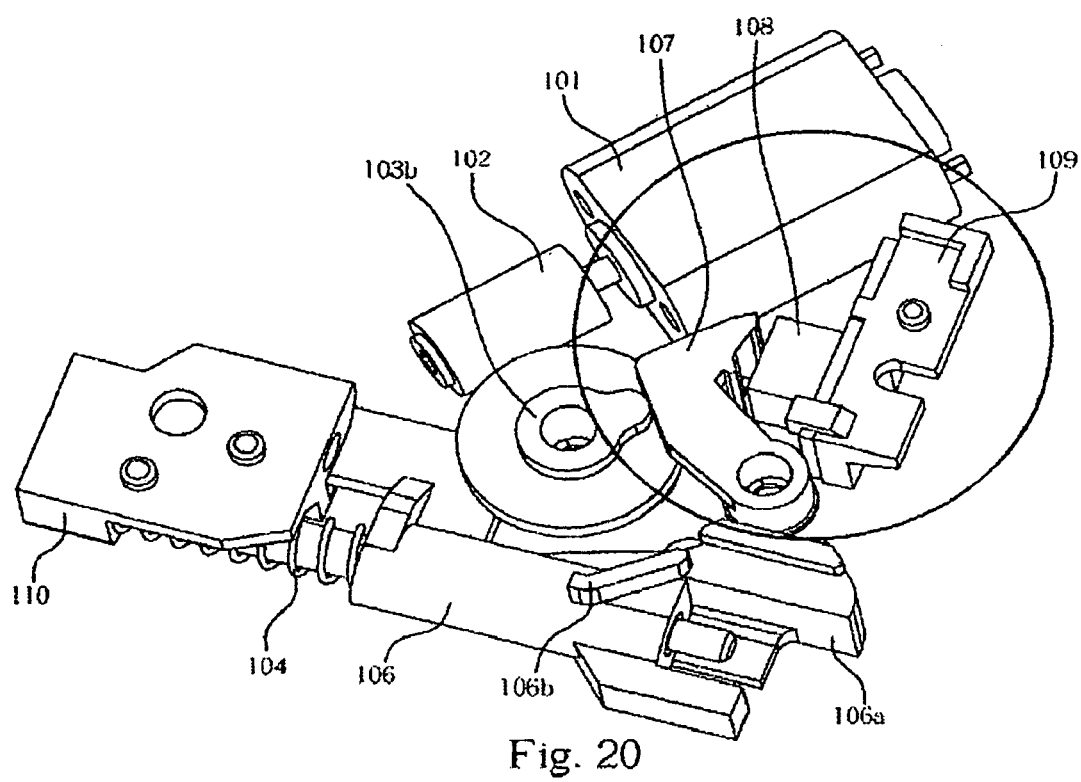
Figure 21:
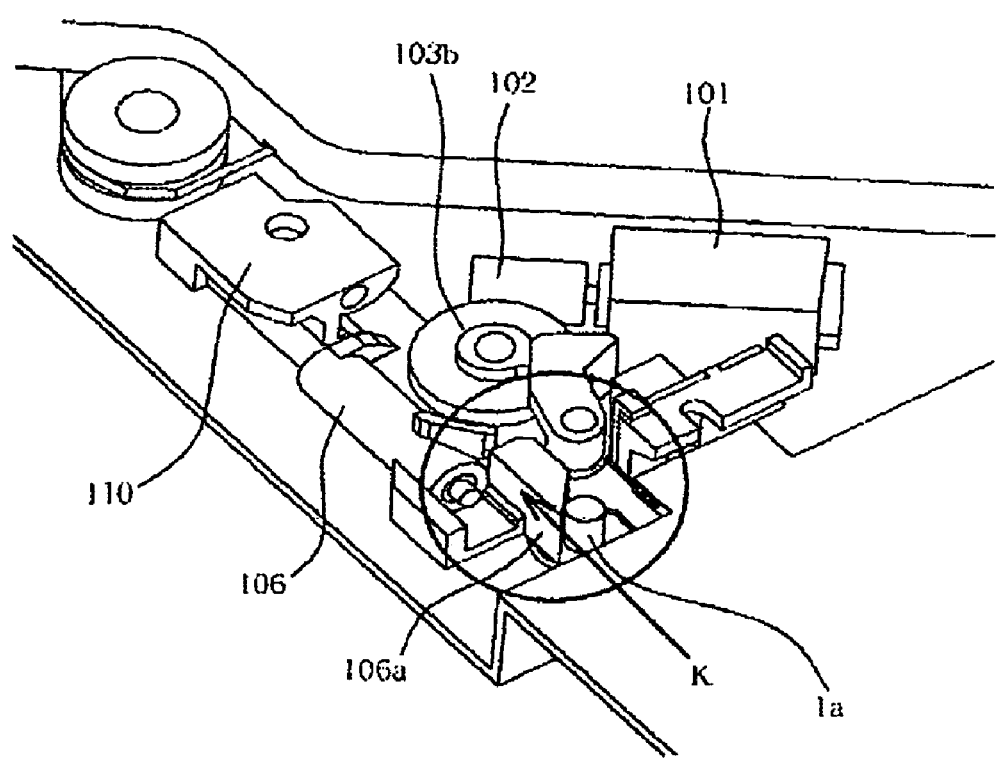

Please refer to FIG. 15, FIG. 16, FIG. 17, FIG. 18, FIG. 19, FIG. 20, and FIG. 21. FIG. 15 to FIG. 21 are different views of components of the tray locking mechanism 10A of the slim optical disk drive in a locking situation according to the present invention. Please refer to FIG. 15. The locking shaft 106 can hook the stop pin 1a (not shown in FIG. 15) for locking the tray 2. At the same time, the lower cam 103b of the worm gear 103 and the pressing arm 107 are located as shown in FIG. 16. Please refer to FIG. 17. When the ejection button 3 is pressed down, the driving element 101 starts to rotate for driving the worm shaft to rotate in the "G" direction so that the worm gear can rotate in the "H" direction. When the worm gear 103 rotates 180 degrees, the upper cam 103a of the worm gear 103 can drive the locking shaft 106 to move in the "I" direction so that the unciform part 106a can separate from the stop pin 1a and press the elastic element 104. The ejection device 9 can eject the tray 2 by an elastic force provided by the elastic element 104. At the same time, the lower cam 103b of the worm gear 103 and the pressing arm 107 are located as shown in FIG. 18. Please refer to FIG. 19. When the worm gear 103 rotates 300 degrees, the lower cam 103b of the worm gear 103 can push the pressing arm 107 to move in the "J" direction until pressing the switch 108. Please refer to FIG. 20. When the worm gear 103 rotates 360 degrees, the lower cam 103b of the worm gear 103 continues pushing the pressing arm 107 to move in the "J" direction so as to turn on the switch 108 for stopping the driving element 101 from rotating. At the same time, the upper cam 103a of the worm gear 103 can be restored to the original location shown in FIG. 15. The locking shaft 106 can also be restored to the locking position by the elastic force provided by the elastic element 104. When the tray 2 ejects, a user can draw out the tray 2 and put an optical disk onto the tray 2 or remove an optical disk from the tray 2. After placing or removing a disk, the user can push the tray 2 into the main body 1. Please refer to FIG. 21. At this time, the stop pin 1a can push the locking shaft 106 in the "K" direction, and then the locking shaft can hook the stop pin 1a so as to lock the tray 2. The elastic element 92 of the ejection device 9 can be compressed for storing the elastic energy to drive the tray 2 for the next ejection.

Figure 14:
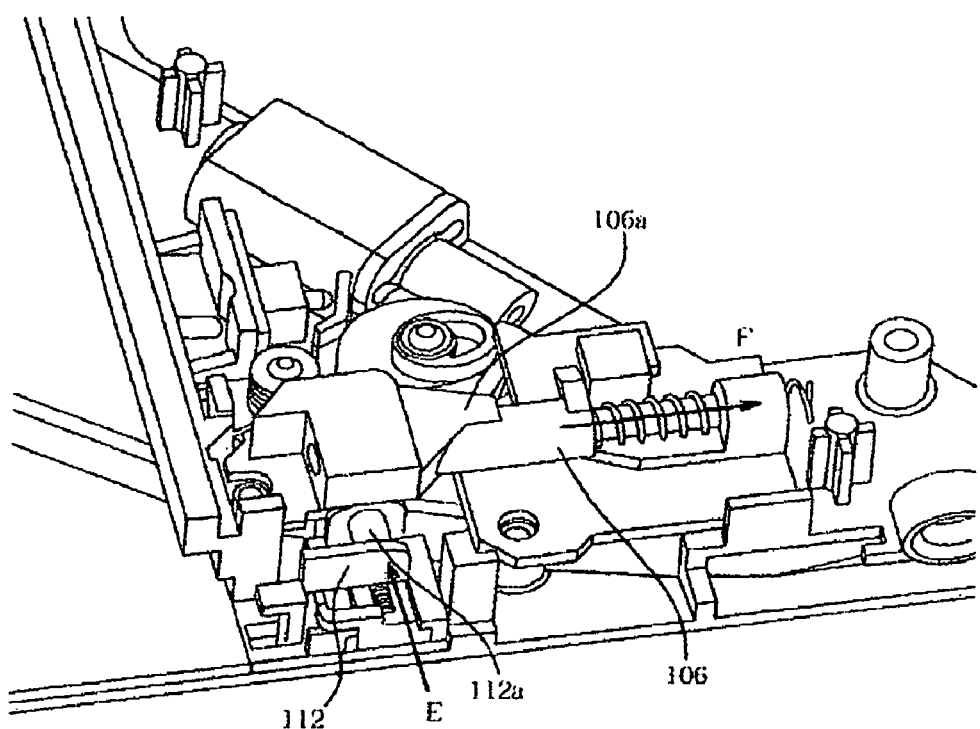
FIG. 14 is a drawing of an emergency ejection device of the tray locking mechanism.
Figure 15:
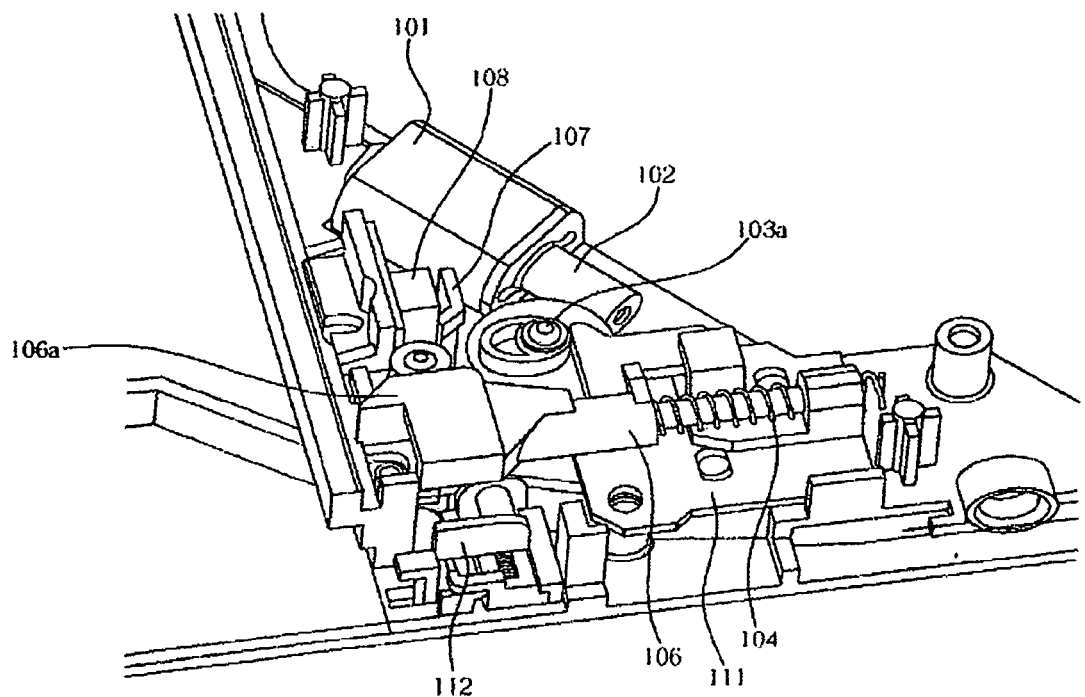
FIG. 15 to FIG. 21 are different views of components of the tray locking mechanism of the slim optical disk drive in a locking situation according to the present invention.

Sometimes the tray locking mechanism 10A cannot eject the optical disk normally for some reason. An emergency ejection device 12 can solve this problem. Please refer to FIG. 14. FIG. 14 is a drawing of the emergency ejection device 12 of the tray locking mechanism 10A. Please refer to FIG. 10 and FIG. 14. The emergency ejection device 12 includes the emergency ejection element 112 and the elastic element 13. The elastic element 113 is sheathed on the emergency ejection element 112, and the emergency ejection element 112 is sheathed on the tray 2. When a force is applied in the "E" direction, a front part 112a of the emergency ejection element 112 can push the driving part 106b of the locking shaft 106 to move in the "F" direction so that the unciform part 106a can separate from the stop pin 1a and the tray 2 can eject.

In contrast to the prior art, the tray locking mechanism according to the present invention can make a tray of the slim optical disk drive be locked and ejected smoothly. In addition, the tray locking mechanism according to the present invention provides an emergency ejection device to solve the problem of the conventional tray locking mechanism 10 failing so that the tray can not be ejected.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A tray locking mechanism for use in an optical disk drive, the optical disk drive comprising a main body and a tray, the tray locking mechanism comprising:

a base fixed to the tray;

a locking device installed on the base for combining with or separating from a stop pin of the main body;

a transmission device installed on the base for driving the locking device;

a control device installed on the base for stopping the transmission device; and an emergency ejection device for ejecting the tray, comprising an emergency ejection element sheathed on the tray for pushing the locking device and an elastic element sheathed on the emergency ejection element;

wherein when the locking device combines with the stop pin of the main body, the tray can be locked to the main body, and when the transmission device drives the locking device to be separated from the stop pin of the main body, the tray can eject from the main body and the control device can stop the transmission device from rotating.

2. The tray locking mechanism of claim 1 wherein the locking device further comprises:

a fixer fixed to the base;

a rod whose one end is pivotally connected to the fixer;

a locking shaft, whose one end is pivotally connected to the rod, comprising an unciform part on the other end for hooking the stop pin of the main body to lock the tray, and a driving part; and an elastic element sheathed on the rod for providing an elastic force to the locking shaft.

3. The tray locking mechanism of claim 1 wherein the transmission device further comprises:

a driving element fixed to the base;

a worm shaft sheathed on a transmission shaft of the driving element; and a worm gear sheathed on the base and meshing with the worm shaft.

4. The tray locking mechanism of claim 1 wherein the control device further comprises:

a switch for stopping the transmission device from rotating;

a pressing arm sheathed on the base for pressing the switch; and a fixer fixed to the base for fixing the switch.

5. The tray locking mechanism of claim 1 further comprising an ejection device comprising a rod and an elastic element sheathed on the rod for ejecting the tray by an elastic force of the elastic element.

6. An optical disk drive comprising:

a main body comprising a stop pin;

a tray for sliding between a locking position and an ejecting position corresponding to the main body; and a tray locking mechanism installed on the tray for combining with the stop pin of the main body when the tray is in the locking position and for separating from the stop pin device of the main body when the tray is in the ejecting position, wherein the tray locking mechanism comprises:

a base fixed to the tray;

a locking device installed on the base for combining with or separating from the stop pin of the main body;

a transmission device installed on the base for driving the locking device; and a control device installed on the base for stopping the transmission device; and an emergency ejection element sheathed on the tray for pushing the driving part of the locking shaft and an elastic element sheathed on the emergency ejection element.

7. The optical disk drive of claim 6 wherein the locking device further comprises:

a fixer fixed to the base;

a rod whose one end is pivotally connected to the fixer;

a locking shaft, whose one end is pivotally connected to the rod, comprising an unciform part on the other end for hooking the stop pin of the main body to lock the tray, and a driving part; and an elastic element sheathed on the rod for providing an elastic force to the locking shaft.

8. The optical disk drive of claim 6 wherein the transmission device further comprises:

a driving element fixed to the base;

a worm shaft sheathed on a transmission shaft of the driving element; and a worm gear sheathed on the base and meshing with the worm shaft comprising an upper cam and a lower cam.

9. The optical disk drive of claim 6 wherein the control device further comprises:

a switch for stopping the transmission device from rotating;

a pressing arm sheathed on the base for pressing the switch; and a fixer fixed to the base for fixing the switch.

10. The optical disk drive of claim 6 wherein the tray locking mechanism further comprises an ejection device comprising a rod and an elastic element sheathed on the rod for ejecting the tray by an elastic force of the elastic element.

* * * * *